UNITED STATES PATENT OFFICE.

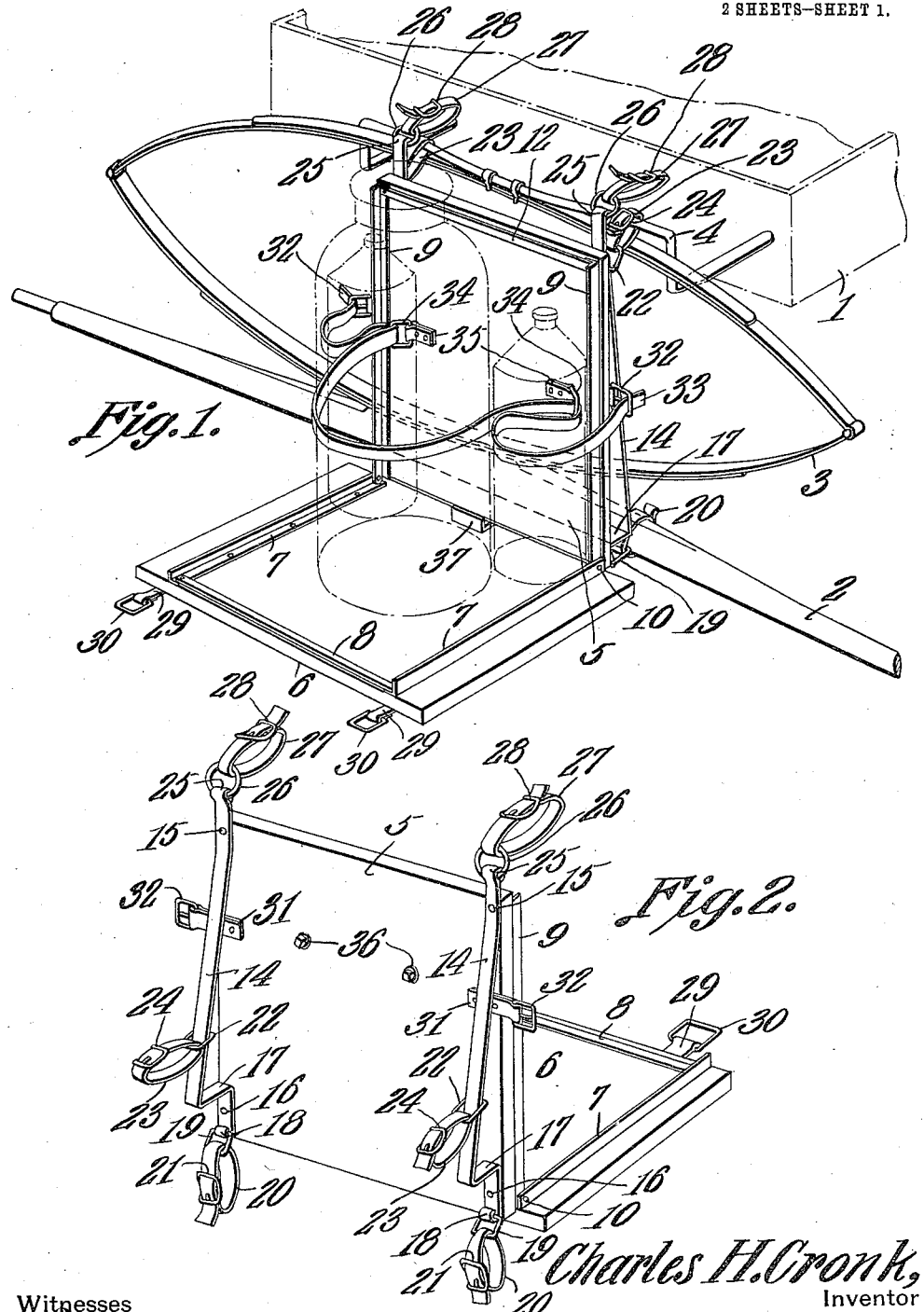

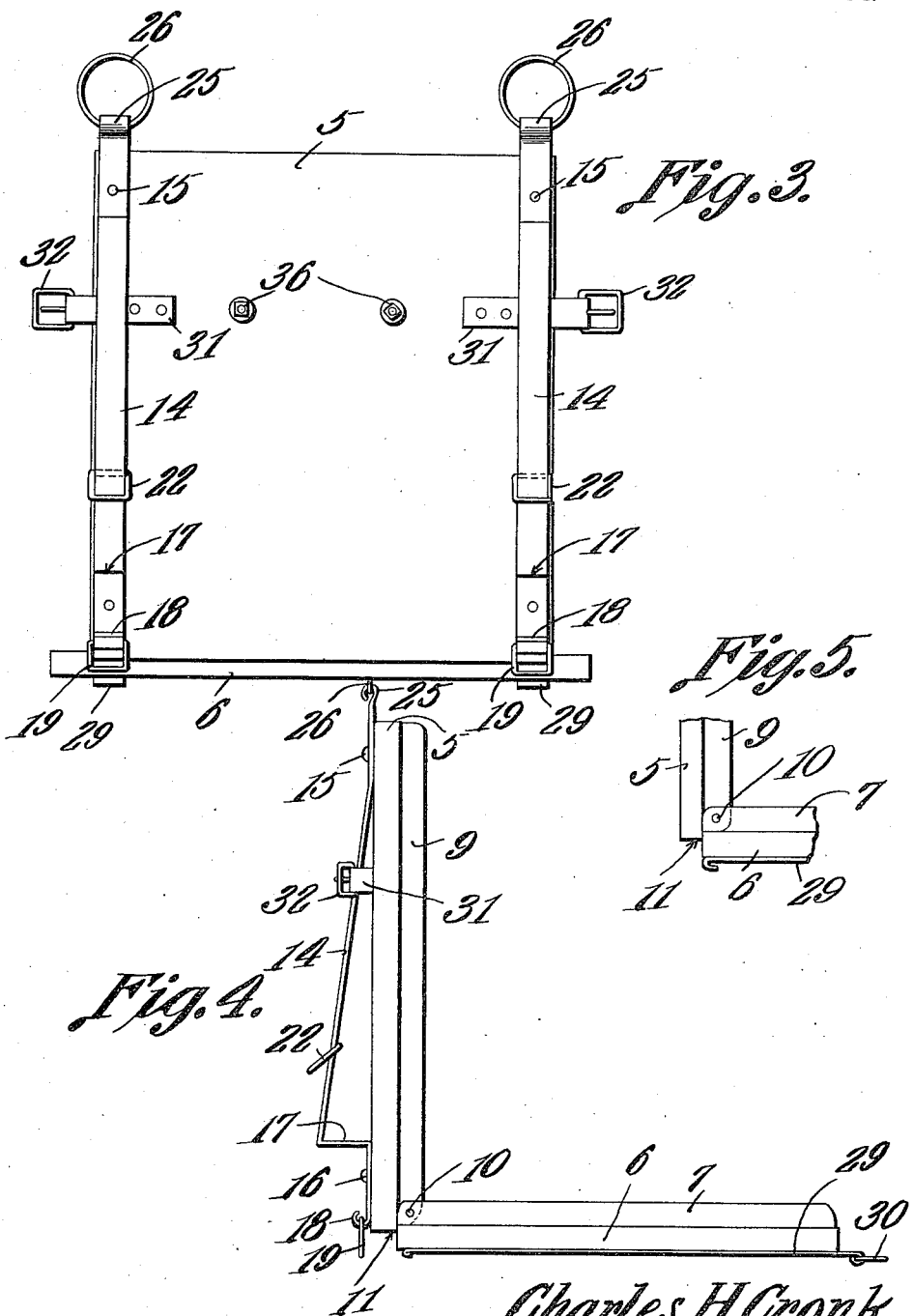

CHARLES H. CRONK, OF CURTIS, NEBRASKA.

FOLDING CARRIER.

1,013,863.  Specification of Letters Patent.  Patented Jan. 9, 1912.

Application filed February 24, 1911. Serial No. 610,613.

*To all whom it may concern:*

Be it known that I, CHARLES H. CRONK, a citizen of the United States, residing at Curtis, in the county of Frontier and State of Nebraska, have invented a new and useful Folding Carrier, of which the following is a specification.

It is one object of this invention to provide a luggage carrier, adapted to be assembled with the running gear of a vehicle in such a manner that the carrier may, at will, be supported rigidly from the axle of the vehicle, or be supported yieldingly from the springs of the vehicle.

Another object of the invention is to provide a luggage carrier of the type above referred to, which may be disposed in small compass when not in use, novel means being provided for holding articles upon the carrier, when the same is in use.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, Figure 1 shows the invention in perspective, assembled with a vehicle body; Fig. 2 shows the invention in perspective, the rear of the structure being disclosed; Fig. 3 is a rear elevation; Fig. 4 is a side elevation; and Fig. 5 is a detail enlarged from Fig. 4, the view illustrating the manner in which the back and the platform coöperate, to maintain these parts in angular relation when the device is in use.

In Fig. 1 of the drawings, a portion of the body of a vehicle is shown, and denoted by the numeral 1.

The numeral 2 denotes one axle of the vehicle, the numeral 3 denoting the springs, and the numeral 4 denoting the bed bar whereby the springs are connected with the body 1 of the vehicle.

In carrying out the invention there is provided a back 5 and a platform 6, angle members 7 being secured to the upper face of the platform 6, to extend from the rear of the platform toward the free, forward edge thereof. The outer extremities of the angle members 7 may be united by a tie bar 8, secured to the platform 6. Angle members 9 are secured to the forward face of the back 5, the angle members 9 upon the back being pivotally connected, as shown at 10, with the angle members 7 upon the platform.

As clearly shown in Fig. 5, the back 5 and the platform 6 knuckle together, as shown at 11, and abut, so as to hold the platform 6 approximately at right angles to the back 5, when the device is in use. The upper extremities of the angle members 9 which are secured to the back 5, may be connected by a tie bar 12, secured to the back.

Mounted in upright relation upon the rear face of the back 5, are guides 14, secured at their upper ends to the back, as shown at 15, the lower ends of the guides 14 being secured to the back, as shown at 16. The intermediate portions of the guides 14 are spaced apart from the back 5, the guides being bent upon themselves, to form outstanding shoulders 17. In the lower extremities of the guides 14, eyes 18 are formed, these eyes carrying rings 19, in which are mounted flexible elements 20, provided with buckles 21, of any desired type.

Slidably mounted upon the guides 14, above the shoulders 17, are rings 22, through which are threaded flexible elements 23, equipped with suitable buckles 24. In the upper extremities of the guides 14, eyes 25 are fashioned, there being rings 26 carried by the eyes 25. Through the rings 26, flexible elements 27 are inserted, these flexible elements carrying buckles 28.

To the lower face of the platform 6, parallel bars 29 are secured, the bars protruding beyond the outer, free edge of the platform, and being there supplied with rings 30. Straps 31 are secured to the back 5, the straps outstanding slightly beyond the back, and carrying buckles 32. The buckles 32 are adapted to engage the extremities of a strap 33, the intermediate portion of the strap being through eyes 34, carried by brackets 35, mounted in spaced relation upon the forward face of the back 5, the brackets being through-bolted, as shown at 36, to the back 5, or otherwise secured thereto. Secured to the upper face of the platform 6, in close relation to the back 5, is an angular stop 37.

In mounting the device, as above described, upon a vehicle, the flexible members 20 are passed about the axle 2, the flexible members 23 being passed about the bed bar 4. The platform 6 will normally stand in the projecting position seen most clearly in Fig. 1, and upon the platform 6 may be superposed one or more articles, the strap 33 being passed about these articles, the intermediate portion of the strap being engaged through the eyes 34, and the extremities of the strap being engaged in the buckles 32. As clearly shown in Fig. 1, several articles may thus be held in place upon the platform 6, by the strap 33. The stop 37 will serve to hold one of the articles in place upon the platform 6, so that such article may be firmly bound by the strap 33.

When the device is not in use, the platform 6 may be upturned against the back 5, and, under such circumstances, the straps 27 are passed through the rings 30, in order to hold the platform 6 in its upturned position. When, as shown in Fig. 1, the device is positioned for use, the straps 27 may be passed through the bails or securing cords of small packages. When a heavy load is to be carried by the platform 6, the flexible members 20 will be drawn tightly about the axle 2, so that the load which is upon the platform 6 will be carried by the axle 2, the flexible members 23 being slacked away, and in any event, when the flexible elements 20 are drawn tightly about the axle 2, the slidable mounting of the rings 22 upon the guides 14, will serve to throw the weight upon the axle. If, however, a light load, or a fragile one, is to be carried by the platform 6, the flexible members 20 are slacked away, so as to throw all of the weight upon the flexible members 23. In the latter instance, the weight will be borne entirely by the spring 3, and thus the load will be resiliently supported, breakage through jolting being avoided.

By reason of the fact that the rings 22 are slidably mounted upon the guides 14, relative movement between the body 1 of the vehicle and the axle 2 thereof will be permitted, even though the flexible members 20 be drawn tightly about the axle 2.

Having thus described the invention, what is claimed is:—

A device of the class described comprising a back and a platform hinged together, and abutting to stand normally in angular relation; guides secured to the back; rings held against sliding movement in the lower ends of the guides; flexible elements mounted in the rings; rings slidable upon the guides; flexible elements in the last named rings; rings secured in the upper ends of the guides; rings secured to the free outer edges of the platform; and flexible securing elements adapted to engage the two last named sets of rings, to uphold the platform against the back.

In testimony that I claim the foregoing as my own, I have hereto affixed my signature in the presence of two witnesses.

CHARLES H. CRONK.

Witnesses:
  CHAS. TURNER,
  S. W. GILBERT.

---

Copies of this patent may be obtained for five cents each, by addressing the "Commissioner of Patents, Washington, D. C."